Patented Sept. 14, 1926.

1,600,047

UNITED STATES PATENT OFFICE.

FREDERICK KAYE, OF ASHTON-ON-MERSEY, ENGLAND.

MANUFACTURE OF MOLDED OR PRESSED GOODS FROM FIBROUS MATERIALS.

No Drawing. Application filed September 4, 1923, Serial No. 660,937, and in Great Britain November 7, 1922.

This invention refers to the manufacture of articles or objects of various kinds, and such as are commonly designated molded or pressed goods, from fibrous materials, and it relates in particular to the manufacture of such goods from rubber or like latex-treated pulped fibers.

According to the invention, any fibrous material, vegetable or animal, waste paper, waste paper-boards or the like or any mineral fibers, such as asbestos, together with mineral filling such as china clay etc., which can be used in the manufacture of paper or paper-boards are treated with rubber-containing latex after or while being beaten in the beating engine of a paper-making machine and the rubber in the latex is coagulated on the beaten fibers. The quantity of latex to be used may be of any desired and convenient proportion. The beaten latex-treated material is then run off on a paper-board making machine without any drying, or with only partial drying of the sheeted pulp. The still soft sheeted pulp is then passed through any suitable disintegrating machine whereby the compound and sheeted material is torn into small and as far as possible fleecy pieces. This shredded, powdered or disintegrated material is then molded or pressed under suitable pressure into the form of plates, tubes, blocks, or other desired shapes in suitably constructed molds, with, or without the further addition of other fibers, waste rubber in a granular, powdery or fleecy condition, together with, if desired, any mineral powders or fillers according to the character of the goods to be made and the use to which they are to be put.

Any suitable form of powdered sulphur or soluble sulphur compounds such as the soluble alkaline sulphides may be added at any convenient point in the process but preferably the soluble alkaline sulphides will be added to and mixed with the natural or alkaline preserved latex before its addition to the beaten fibers. When the acid or mineral salts, which are added to coagulate the rubber are present in excess, they will decompose the sulphides to give colloidal sulphur closely associated with the coagulated rubber or to give insoluble sulphides together with free sulphur. Any suitable accelerator may be added at any suitable point in the process, these accelerators being such that, if possible, they are able to accelerate the vulcanization of rubber at lower temperatures than the temperature at which vulcanization is usually brought about.

The molded goods, if they are to be vulcanized, may be heated under water, or in steam, or at a dry heat at convenient temperatures and under suitable conditions.

The making of the pulped fibers into soft sheets prior to molding affords the great advantage of getting rid of the excess of water from the pulp quickly and in a continuous manner. Such method may be usefully applied to the preparation of other than latex-treated pulped fibers for molding purposes.

In some cases, the molded articles may be made directly from the latex-treated pulp i. e. without first being made into soft sheets, the pulp being drained after removal from the beater in any suitable manner, and then molded, or disintegrated and molded. This method may be used when only a small quantity of pulp requires to be drained.

The presence of the coagulated latex on the fibers helps under pressure to bind the fibers and the various fillers, etc., into a homogeneous mass, and also adds to the strength, and water-proof qualities of the finished goods.

Gutta-containing or balata-containing latex may be used in place of, or in addition to the rubber-containing latex.

What I claim is:—

1. In the manufacture of molded or pressed goods from paper-making materials, adding to the materials, while in the beating engine, a latex having a hydro-carbon base, such as rubber, balata or gutta percha, together with a coagulant, beating the latex-treated material to a pulp, afterwards removing any excess of moisture on a paper-making machine, then disintegrating the soft sheets thereby formed, and finally molding the resultant plastic mass to the desired shape of article to be produced and drying, as set forth.

2. In the manufacture of molded or pressed goods from paper-making materials, adding to the materials while in the beating engine of a paper-making machine, a rubber-containing latex to which has been previously added a small quantity of soluble alkaline sulphide, then adding to the latex-treated pulp an acid to coagulate the rubber, then beating the latex-treated material to a pulp, then removing the excess moisture in a paper making machine, disintegrating the soft sheets thereby formed, and finally molding the plastic mass into the shape of article required and drying, as set forth.

In testimony whereof I have signed my name to this specification.

FREDERICK KAYE.